May 12, 1936.  A. C. RECKER  2,040,628
BRANCH FITTING AND METHOD OF MAKING
Filed Aug. 3, 1934
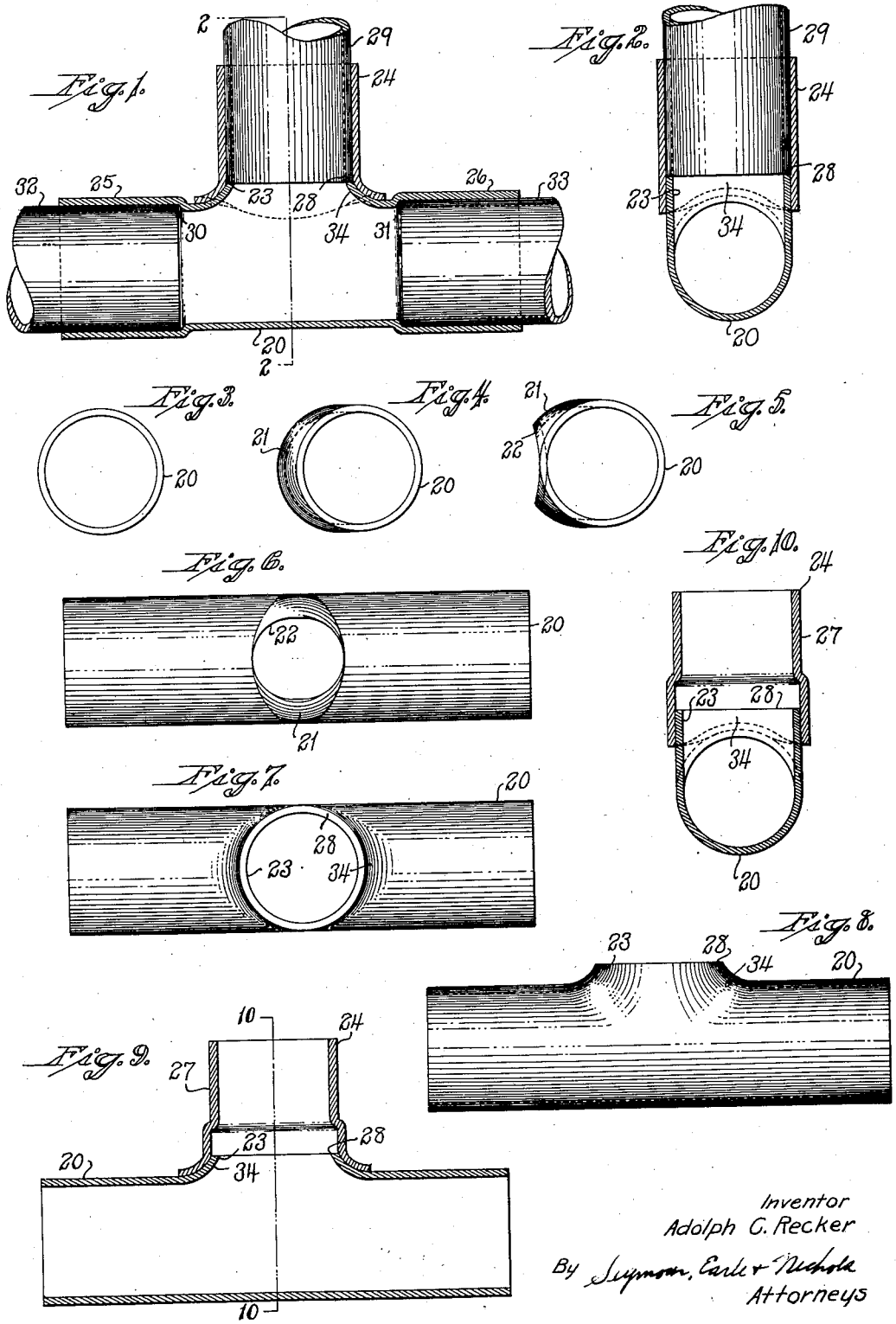
Inventor
Adolph C. Recker
By Seymour, Earle & Nichols
Attorneys Patented May 12, 1936

2,040,628

UNITED STATES PATENT OFFICE 2,040,628

BRANCH-FITTING AND METHOD OF MAKING

Adolph C. Recker, Watertown, Conn., assignor to The Chase Companies, Incorporated, Waterbury, Conn., a corporation Application August 3, 1934, Serial No. 738,244

8 Claims. (Cl. 29—157)

This invention relates to improvements in branch-fittings and methods of making the same, and more particularly to branch-fittings made of non-ferrous metal.

One object of this invention is to provide an improved branch-fitting formed of a plurality of parts and so constructed as to result in a minimum of friction of fluids passing from the line-member out through the branch-member of the fitting.

Another object of this invention is to provide an improved branch-fitting formed of a plurality of elements readily manufactured and readily assembled to produce a durable and efficient construction at minimum cost.

Another object of this invention is to provide an improved method by which an improved branch-fitting can be efficiently and economically produced.

With the above and other objects in view, this invention includes all improvements over the prior art which are disclosed in this application.

In the accompanying drawing, in which one way of carrying out the invention is shown for illustrative purposes:

Fig. 1 is a longitudinal, vertical, sectional view illustrating one form of branch-fitting in the form of a T constructed in accordance with this invention;

Fig. 2 is a sectional view on line 2—2 of Fig. 1;

Fig. 3 is an end view of a tubular member from which the line-member of the fitting is formed;

Fig. 4 is an end view of the tube shown in Fig. 3, with a lateral bulge produced therein midway of its length;

Fig. 5 is a view similar to Fig. 4, with the central portion of the bulge punched out;

Fig. 6 is a view from the left of Fig. 5, showing the central punched-out opening;

Fig. 7 is a view similar to Fig. 6, with the punched opening enlarged to its final form;

Fig. 8 is a view similar to Fig. 7, but at right angles thereto;

Fig. 9 is an assembly view, showing the line-member of Fig. 8 with a branch-member joined thereto; and Fig. 10 is a sectional view on the line 10—10 of Fig. 9.

In the description and claims, the various parts and steps are identified by specific names for convenience, but they are intended to be as generic in their application as the prior art will permit.

Referring to the drawing, the tube or line-member 20 is first given a central bulged-out portion 21 by the application of suitable known tools within the interior of the tube 20, after which the center of the bulged portion 21 is punched out to provide the central oval opening 22. The metal surrounding the oval opening 22 is then forced outward by any suitable method such as by balling, to produce an annular opening 23.

A branch-member or saddle 24 of the form shown in Figs. 9 and 10 is formed from a piece of tubing of suitable size, which may or may not be the same size as the line-tube 20, depending on the sizes of the various openings of the branch-fittings desired. The parts 20 and 24 are then joined together, preferably by hard soldering or electric welding, the term "hard soldering" including the use of such solders, for example, as silver solder, brass solder, and the like.

In the form of the invention illustrated in the drawing, it will be noted that the internal diameter of the branch-member 24 in Figs. 9 and 10 is substantially the same diameter as the opening 23 in the line-member 20.

The comparatively-high temperature which is developed as the result of electric welding or hard soldering, softens or anneals the branch-fitting to so considerable a degree as to render the fitting readily subject to denting, particularly near the ends of the various openings of the fittings. This is especially true in the case of non-ferrous metals, such, for example, as copper and metals of high copper content, as well as other non-ferrous metals.

In order to overcome this unduly soft condition of the fitting, the metal around the various openings of the fitting is then subjected to cold working, which so hardens the metal as to render it satisfactorily resistant to denting.

This cold working in the form of the invention illustrated in Fig. 1 of the drawing is accomplished by expanding or bell-mouthing the line portions 25 and 26 and the branch portion 27 from the sizes they had in Fig. 9.

It will be observed that when the branch portion 27 is expanded to the size shown in Figs. 1 and 2, the annular edge 28 of the opening 23 forms a limit-shoulder for a tube or pipe 29, which is telescopically engaged and properly soldered or sweated within the branch portion 27. Similarly, the annular shoulders 30 and 31 act as limit-shoulders for the tubes or pipes 32 and 33 respectively, which are telescopically engaged and soldered or sweated within the line portions 25 and 26 respectively.

It will be observed that the curved portion 34 surrounding the opening 23 is smooth and rounded and acts to efficiently direct the flow of fluid, such, for example, as water, from the line-member 20 into the branch portion 27 with a minimum of friction.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. A non-ferrous metal branch-fitting having tube-engaging, line and branch portions and produced in unfinished form from a number of parts joined together by the aid of heat, said tube-engaging portions being finish-formed by cold working for the purpose of hardening the same.

2. A non-ferrous metal branch-fitting having tube-engaging, line and branch portions and produced in unfinished form from a number of parts joined together by the aid of heat, said tube-engaging portions being finish-formed by cold expanding for the purpose of hardening the same.

3. A non-ferrous metal branch-fitting having telescopic tube-engaging, line and branch portions and produced in unfinished form by joining one or more branch-members over one or more corresponding lateral ports in a line-member by the aid of heat, said tube-engaging portions being finish-formed by cold expanding, the edge of each said lateral port forming a limit-shoulder for a tube telescopically engaged in the corresponding said branch portion.

4. A metal branch-fitting having telescopic tube-engaging, line and branch portions and produced by joining one or more branch-members over one or more corresponding lateral ports in a line-member, the metal of the line-member surrounding a lateral port being bulged out transversely of the axis of the line-member and extending into and fitting within the corresponding branch-member and forming a limit-shoulder for a tube telescopically engaged in the corresponding branch portion.

5. The method of making a non-ferrous metal branch-fitting having tube-engaging, line and branch portions, comprising: producing said branch-fitting in unfinished form by joining a number of parts together by the aid of heat, and then finish-forming said tube-engaging portions by cold working.

6. The method of making a non-ferrous metal branch-fitting having tube-engaging, line and branch portions, comprising: producing said branch-fitting in unfinished form by joining a number of parts together by the aid of heat, and then finish-forming said tube-engaging portions by cold expanding.

7. The method of making a non-ferrous metal branch-fitting having tube-engaging, line and branch portions, comprising: forming one or more lateral ports in a line-member; joining a branch-member to the line-member over each lateral port by the aid of heat; and then finish-forming said tube-engaging portions by cold working.

8. The method of making a non-ferrous metal branch-fitting having telescopic tube-engaging, line and branch portions, comprising: forming one or more lateral ports in a line-member; joining a branch-member to the line-member over each lateral port by the aid of heat; and then finish-forming said tube-engaging portions by cold expanding.

ADOLPH C. RECKER.